United States Patent [19]

Chan et al.

[11] Patent Number: 5,550,861
[45] Date of Patent: Aug. 27, 1996

[54] MODULAR PCMCIA MODEM AND PAGER

[75] Inventors: Demonder Chan, Palo Alto; Robert B. Fultz, Boulder Creek; Baldev Krishan, Fremont, all of Calif.

[73] Assignee: Novalink Technologies, Inc., Freemont, Calif.

[21] Appl. No.: 330,752

[22] Filed: Oct. 28, 1994

Related U.S. Application Data

[63] Continuation-in-part of Ser. No. 313,414, Sep. 27, 1994.
[51] Int. Cl.⁶ .............................. H04B 1/38; H04Q 7/14
[52] U.S. Cl. .................. 375/222; 340/825.44; 455/38.2
[58] Field of Search .......................... 375/222; 379/58; 455/38.2; 340/825.44

[56] References Cited

U.S. PATENT DOCUMENTS

| | | | |
|---|---|---|---|
| 4,661,972 | 4/1987 | Kai | 379/170 |
| 4,682,352 | 7/1987 | Durham | 375/222 |
| 4,847,863 | 7/1989 | Watson | 375/222 |
| 5,040,204 | 8/1991 | Sasaki et al. | 379/58 |
| 5,050,041 | 9/1991 | Shafi | 375/222 |
| 5,249,218 | 9/1993 | Sainton | 379/59 |
| 5,337,044 | 8/1994 | Folger et al. | 340/825.44 |
| 5,361,296 | 11/1994 | Reyes et al. | 375/222 |

OTHER PUBLICATIONS

Mori, "The PCMCIA Developer's Guide," Sycard Technology, Sunnyvale California (1994), p. 112.
"An Introduction To PCMCIA And PC Card Technology," PCMCIA Headquarters, Sunnyvale, California, brochure, circa 1992.
"Modem Communications: A Modem Primer", Multitech Systems, Inc., Mounds View Minnesota (Sep. 1992).
R. H. Tridgell, "Radiopaging and Messaging," in Mobile Information Systems, Artech House, Inc. (J. Walker, ed. 1990), pp. 16–57.
"Rockwell RC96ACL/RC144ACL Modem and RC96ACi/RC144ACi Modem Designer's Guide," Rockwell international, digital Communication Division (Apr. 1993).
"PCF5001 POCSAG Paging Decoder." Data Sheet, Philips Semiconductors (Jun. 1993).
"Q. 12–1/8, S.P. 12A/8, Radio Paging Systems", CCIR Radio Paging Code Standards Group (1980).
"Recommendation 539–1 Technical and Operational Characteristics of Future International Radio–Paging Systems", CCIR Radio Paging Code Standards Group (1982).
"Report 499–3, Radio–Paging Systems", CCIR Radio Paging Code Standards Group (1982).
"Recommendations 584, Standard Codes and Formats For International Radio Paging" CCIR Radio Paging Code Standards Group (1982).
"Report 900, Radio–Paging Systems," CCIR Radio Paging Code Standards Group (1982).

Primary Examiner—Stephen Chin
Assistant Examiner—Jeffrey W. Gluck
Attorney, Agent, or Firm—Fish & Neave; Nicola A. Pisano; Michael J. DeHaemer

[57] ABSTRACT

A computer peripheral is provided that combines the functionality of multiple devices, for example, a pager, a facsimile machine, and a data modem. The computer peripheral is designed as one or more separable modules, or functional components, including a module for interfacing the peripheral to a host computer. At least one of the functional components can be operated either as part of the computer peripheral, or may be separated from the remainder of the computer peripheral and used as a self contained functional module.

27 Claims, 3 Drawing Sheets

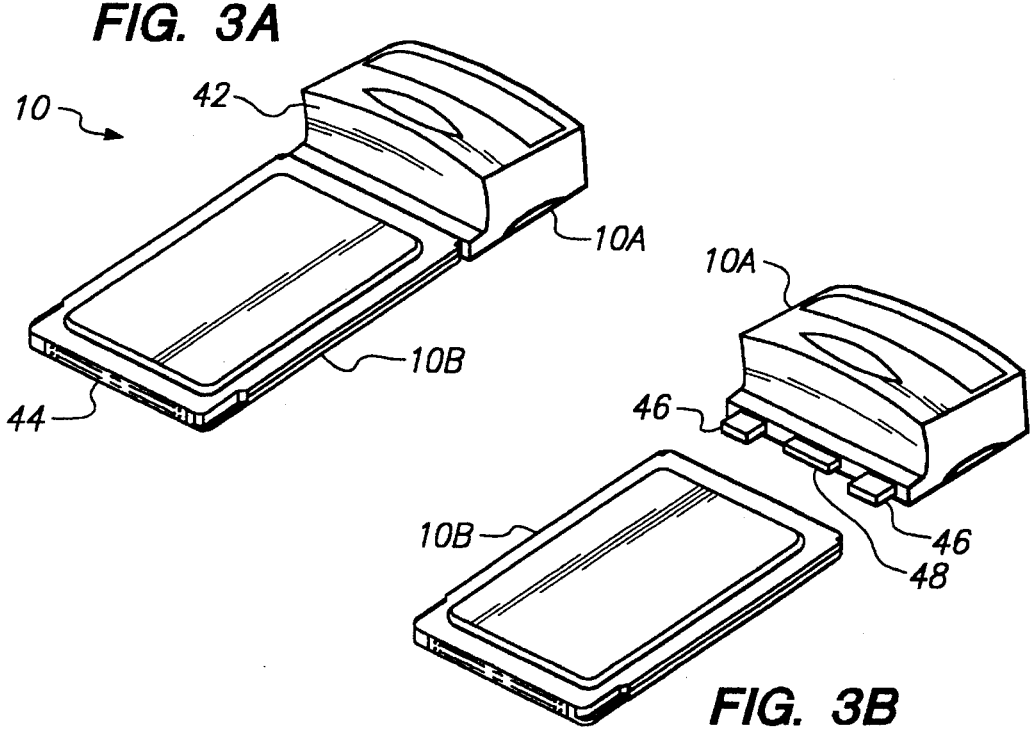
FIG. 3A
FIG. 3B
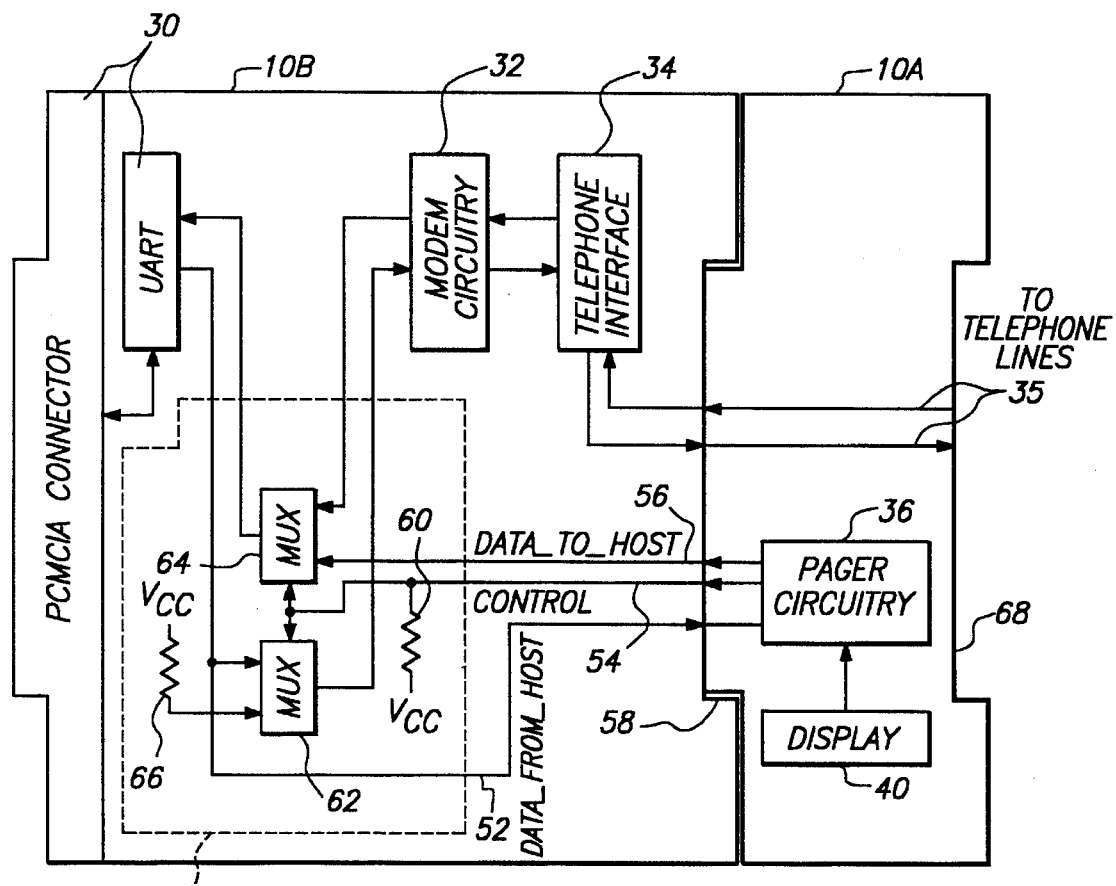
FIG. 4

FIG. 5A
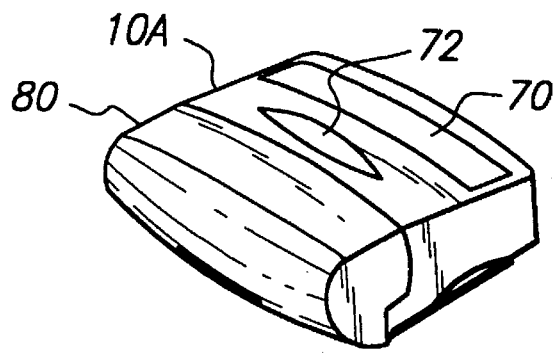
FIG. 5B
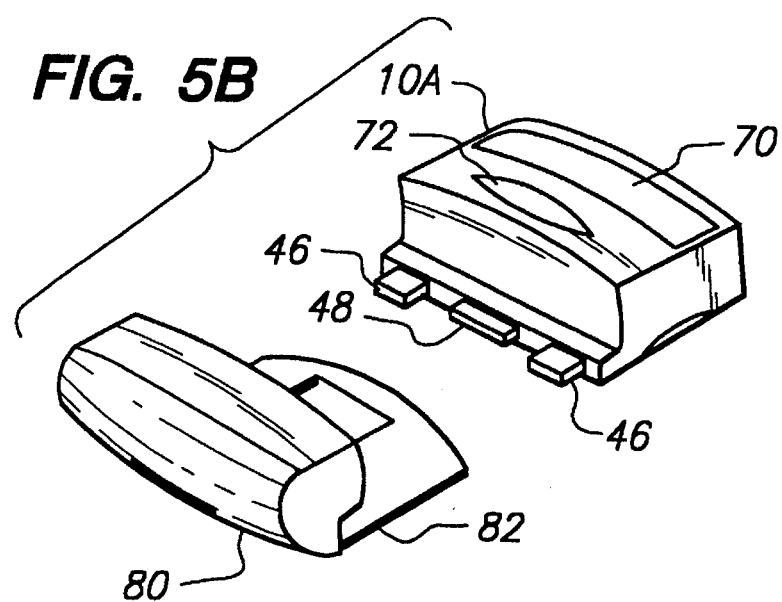
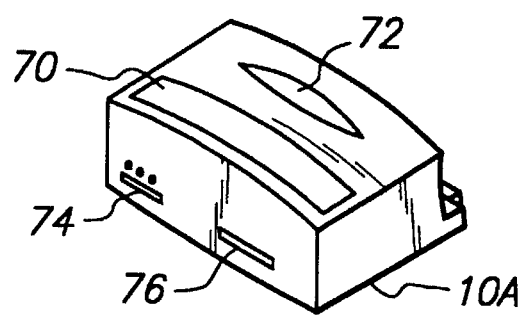
FIG. 5C

MODULAR PCMCIA MODEM AND PAGER

This application is a continuation-in-part of pending U.S. patent application Ser. No. 08/313,414, filed Sep. 27, 1994, for PCMCIA SERIAL INTERFACE.

BACKGROUND OF THE INVENTION

This invention relates to modular computer peripherals and more particularly to a modular peripheral combining a pager with a PCMCIA based fax-modem.

Today's working professional relies heavily on modern technology; computers, telephones, modems and facsimile machines have become indispensable office equipment. The mobile professional supplements office-bound equipment with laptop computers, cellular telephones, pagers, and fax/modems to maintain the same degree of connectivity while away from the office. In an effort to capitalize on the mobile professional's need for an "office-in-a-briefcase", devices which combine the functionality of a pager, a facsimile machine, and a computer modem into a single computer peripheral have been developed. Such a device, combining a fax/modem and a radio pager into a single PCMCIA peripheral is disclosed in co-pending commonly assigned U.S. patent application Ser. No. 08/174,797, filed Dec. 29, 1993, which is incorporated herein by reference in its entirety.

While a combination device has many benefits, there are instances when a professional does not need, or want, to carry all of the aforementioned devices. For example, while attending a business lunch, the professional may desire to carry only a pager, without bringing a laptop computer. Using previously known devices, it is possible to remove the combined pager/fax/modem devices from the laptop and thus have a pager without the laptop. However, due to the specified dimensions of a PCMCIA slot and card, and due to the need to provide the pager with a battery for power when it is not connected to the computer, the combined pager/modem device has bulkier packaging than either the pager or PCMCIA modem alone. In addition, the relatively fragile transition between the thin PCMCIA card portion of the device and the bulkier pager portion of the device is vulnerable to bending stresses. It would therefore be advantageous to be able to separate the pager component of the combined pager/fax/modem peripheral from the remaining components. In this way, the pager may be carried separately or coupled to the remainder of the combination peripheral and installed in a laptop computer, as the user desires.

In order to separate the pager from the remainder of the pager/fax/modem device, circuitry must be provided so that the computer can selectively communicate with either the fax/modem or the pager. Furthermore, the fax/modem portion must be capable of operation regardless of whether the pager is attached or not. Co-pending commonly assigned U.S. patent application Ser. No. 08/313,414, for PCMCIA SERIAL INTERFACE, filed Sep. 27, 1994 and which is incorporated herein by reference in its entirety, discloses circuitry for providing such an interface between a detachable pager and a PCMCIA based fax/modem card.

When the pager portion is attached to the fax/modem portion of the peripheral, the pager draws power from the laptop computer via the fax/modem PCMCIA card. Since the pager draws power from the laptop, it is not necessary to provide a separate power source (e.g. a battery) for the pager when it is coupled to the fax/modem. Indeed, since the power source for the pager contributes a significant fraction of the total weight of the pager, removing the battery from the pager when it is coupled to the fax/modem reduces the weight of the pager and therefore reduces the stress placed upon the mechanical and electrical joint between the pager portion and the fax/modem portion of the peripheral.

SUMMARY OF THE INVENTION

In view of the foregoing, it is an object of this invention to provide a computer peripheral that combines the functionality of a pager, a fax machine, and a computer modem.

It is another object of this invention to provide a modular design for a peripheral combining a pager, fax and modem, in which the a pager portion of the peripheral is separable from the remainder of the peripheral.

It is still another object of the invention to provide a means for a pager portion of a modular pager/fax/modem to draw power from a host computer when the pager portion is coupled to the computer via a fax/modem portion of the peripheral.

BRIEF DESCRIPTION OF THE DRAWINGS

FIGS. 3A and 3B are perspective views of the modular pager/fax/modem peripheral of FIG. 1.

FIG. 4 depicts an illustrative block diagram schematic of a modular fax/modem/pager in accordance with principles of the present invention.

FIGS. 5A, 5B, and 5C are perspective views of the pager portion of the modular pager/fax/modem peripheral of FIG. 1.

DETAILED DESCRIPTION OF THE INVENTION

The present invention relates generally to the design of modular computer peripherals which combine the functionality of several otherwise separate peripherals. Peripherals designed in accordance with the present invention have multiple functional modules, such that at least one functional module may be separated from and used independently of the remaining modules.

An exemplary embodiment of the invention described hereinafter is that of a modular computer peripheral combining a fax/modem module with a pager module, wherein the pager module is separable from the fax/modem module, and both modules are operable regardless of whether the two modules are coupled to each other or not. It would be readily apparent to one skilled in the art that devices other than pagers and fax/modems could be designed with similar capabilities without departing from the spirit of the present invention. Thus, for example, the fax/modem module may instead, or in addition, include data, voice and cellular capabilities, while the pager module may include any wireless communications capabilities, including two way communications.

Figure 1:
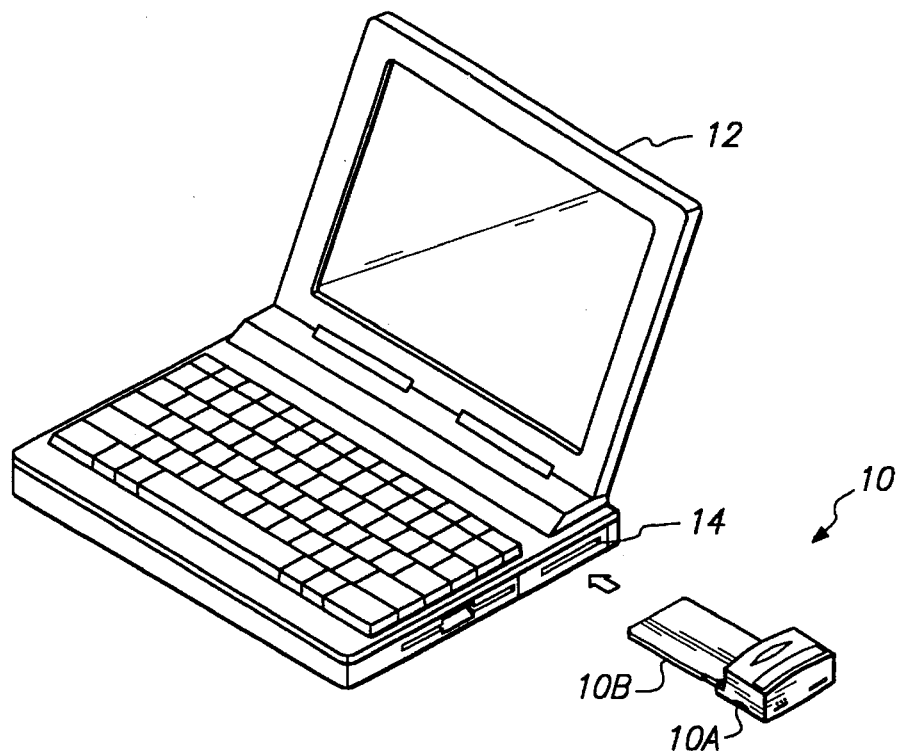
FIG. 1 is a perspective view of an illustrative embodiment of a host computer and a modular pager/fax/modem peripheral of the present invention.
Figure 2:
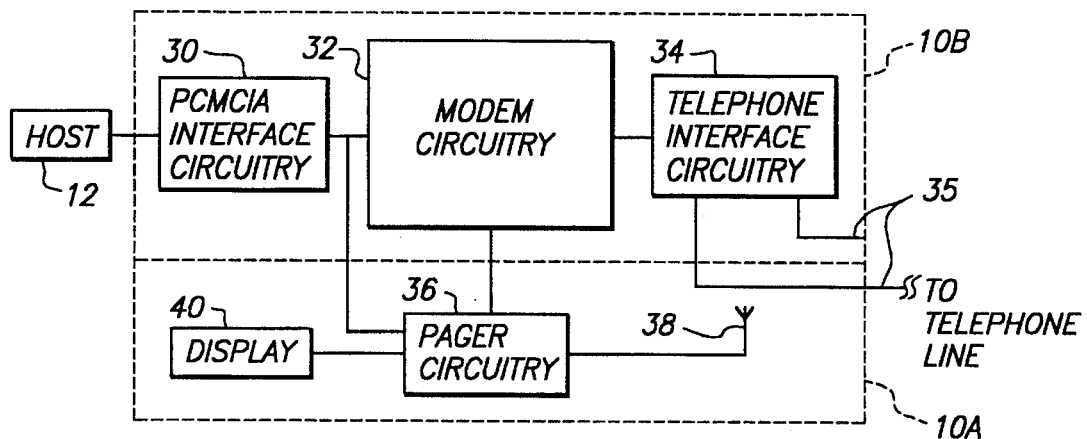
FIG. 2 is an illustrative block diagram of the components of peripheral device 10 of the present invention.

Referring to FIGS. 1 and 2, peripheral device 10 contains circuitry for providing a variety of communication functions, and includes a radio frequency paging module 10A and a fax/modem module 10B. Exemplary circuitry for modules 10A and 10B of peripheral device 10 is shown in FIG. 2, and may include interface circuitry 30, modem circuitry 32, telephone interface circuitry 34, pager circuitry 36, antenna 38 and display circuitry 40.

Interface circuitry 30 connects modem circuitry 32 and pager circuitry 36 to host 12, which may be a conventional desktop computer, a portable personal computer, personal communicator or other suitable data processing device. Preferably, interface circuitry 30 contains a standard integrated circuit for performing interfacing functions and a universal asynchronous receiver transmitter (UART) for serial to parallel and parallel to serial data conversion. As illustrated in FIG. 1, fax/modem module 10B conforms to the Type II Extended Personal Computer (PC) Card specification promulgated by the Personal Computer Memory Card International Association (PCMCIA) of Sunnyvale, Calif.

Modem circuitry 32 enables communication via telephone line 35, and is based on a standard set of integrated circuits that is compatible with most of the widely used modem modulation and control standards. Preferably, modem circuitry 32 has a send and receive facsimile capability and a voice capability, which enables host 12 in combination with peripheral device 10 to function as a telephone answering machine.

Pager circuitry 36 includes a conventional radio-frequency receiver to perform functions related to wireless communications, such as receiving pages and electronic mail (e-mail) messages, via antenna 38. Paging messages decoded by paging circuitry 36 are displayed on display 40. Paging and e-mail messages received by paging circuitry 36 may also be provided for display or processing to host 12.

The foregoing circuit components enable the peripheral device 10 of the present invention to provide a number of modem/paging/e-mail capabilities not available with previously known devices. Module 10A of peripheral device 10 performs the functions of conventional pagers/e-mail receivers. Module 10B provides a compact device offering full fax/modem and telephone answering capabilities for a host device. Exemplary circuitry for modules 10A and 10B of peripheral device 10 is disclosed, for example, in copending and commonly assigned U.S. patent application Ser. No. 08/174,797, filed Dec. 29, 1993, which is herein incorporated by reference.

Referring now to FIGS. 3A and 3B, construction details of exemplary components or modules of peripheral device 10 are shown in greater detail. In FIG. 3A, pager module 10A is shown coupled to PCMCIA fax/modem module 10B. When inserted into PCMCIA slot 14 of FIG. 1, fax/modem module 10B is substantially enclosed within host 12, with side 42 of pager module 10A substantially abutting the side of laptop computer 12. PCMCIA card connector 44 provides electrical coupling between peripheral device 10 and host computer 12 to provide for data transfer therebetween.

FIG. 3B illustrates pager module 10A separated from fax/modem module 10B. Mechanical coupling between the two modules is provided by tenons 46, which fit into corresponding mortises (not visible in FIG. 3B) in the endface of fax/modem module 10B. A detent mechanism between the mortise and tenons ensures that the two modules do not separate inadvertently. Electrical coupling between the two modules 10A and 10B is provided by 15 pin connector 48 which mates to a standard 15 pin PCMCIA auxiliary port (not visible in FIG. 3B) on fax/modem 10B.

With respect to FIG. 4, fax/modem module 10B includes switching circuitry 50, such as that described in U.S. Patent application Ser. No. 08/313,414, filed Sep. 27, 1994, incorporated herein by reference in its entirety, whereby host computer 12 can selectively communicate with either fax/modem module 10B or pager module 10A. The components of FIG. 4 have been marked with like indicator numerals as in FIG. 2.

In accordance with the above-mentioned application, host 12 selects connection to either the modem circuitry of module 10B or the pager circuitry of module 10A using a "connect" command comprising a preselected command code. The particular command code is programmed into software running on host 12, possibly as a configuration option, and is selected so that it does not correspond to an actual command code recognized by the fax/modem module.

Pager module 10A receives, via DATA_FROM_HOST line 52, data sent to modem circuitry 32, and upon recognizing the preselected command sequence, pager circuitry 36 asserts a control signal on CONTROL line 54. When the control signal is asserted, the data path from 12 host to modem circuitry 32 is blocked and a data path from pager circuitry 36 to the host is established via DATA_TO_HOST line 56. To discontinue communications with pager circuitry 36, the host sends another (or even the same) command code to the pager circuitry, causing it to release the control signal, thereby reestablishing the data paths between the host computer and the modem circuitry.

Pager module 10A is interfaced to fax/modem module 10B including modem circuitry 32 and interface circuitry 30 comprising a PCMCIA connector and UART. Switching circuitry 50 is located in the data paths between the UART of interface circuitry 30 and modem circuitry 32. When pager module 10A is not plugged into fax/modem auxiliary port 58, or when pager circuitry 36 is not asserting the control signal on the CONTROL line 54, the control signal is driven to a default state by resistor 60. This causes multiplexers (MUXes) 62 and 64 to couple the UART to modem circuitry 32. A suitable MUX for use as MUXes 62 and 64 is a CD4053 triple 2-channel multiplexer/demultiplexer IC manufactured by National Semiconductor of Santa Clara, Calif.

Serial data sent from the UART to modem circuitry 32 is also sent along DATA_FROM_HOST line 52 to pager circuitry 36. When the pager circuitry receives and recognizes a preselected command code, it asserts a control signal on CONTROL line 54 as described previously herein. An asserted control signal causes MUXes 62 and 64 to disconnect the signal paths between the UART and modem circuitry 32. With the inputs of MUXes 62 and 64 shifted, a mark signal is provided to the input of modem circuitry 32 by pullup resistor 66. DATA_TO_HOST line 56 carrying data from pager circuitry 36 is then supplied to the UART of interface circuit 30 to be delivered to host 12. Thus, serial data from pager circuitry 36 is sent to host computer 12 via MUX 62 and interface circuit 30. When the host no longer needs to communicate with the pager circuitry, a command code is sent causing the pager circuitry to release the control signal on CONTROL line 54. This causes MUXes 62 and 64 to restore the signal paths between UART and modem circuitry 32.

In addition to circuitry in fax/modem module 10B, control circuitry must be provided in pager circuitry 36 to receive and recognize the connect command and to assert a control signal on the CONTROL line. This control circuitry may comprise, for example a microcontroller or microprocessor, although a microsequencer or programmable logic device may also be used. An Intel 8031 microprocessor, available from Intel Corporation of Santa Clara, Calif., is an exemplary microprocessor suitable for use as control circuitry in pager module 10A. Furthermore, in order to preserve modem functionality when pager module 10A is coupled to fax/modem module 10B, all signals on auxiliary port 58 of fax/modem module 10B are fed through to the corresponding pins on auxiliary port 68 of pager module 10A.

Referring now to FIGS. 5A through 5C, various perspective views of exemplary pager module 10A of peripheral 10 are provided. Pager 10A is provided with a user interface comprising a display area 70 and a multi-mode switch 72. The display area 70 is preferably an LCD display and displays menus and messages to the user. Multi-mode switch 72 controls operation of pager module 10A, and is used, for example, in selecting menu options when the pager module is used separately.

Switch 72 preferably is designed with multiple sets of contacts so that the part of the switch pressed by the user is discernable by the pager circuitry. The function of the multimode switch is dependant upon the operating mode of the pager, for example, the switch can be used for navigating through menus by pressing various parts of the switch to choose and select menu items, or for scrolling a lengthy message which may be too large to be displayed all at once, by pressing on the right or left side of the multimode switch to scroll forward or backward respectively.

Battery pack 80 is shown coupled to pager module 10A in FIG. 5A, and separated from pager module 10A in FIG. 5B. Battery pack 80 has a pair of mortises and a 15 pin connector for mechanically and electrically coupling the battery pack to pager module 10A, substantially as describe above in conjunction with coupling between fax/modem module 10B and the pager module. Batteries, for example 2 'AAA' cells (not shown), are contained within battery pack 80 to provide power to pager module 10A through 15 pin connector 48. Exemplary battery pack 80 also has flat projection 82, which, in cooperation with the pager module, functions as a clip, for attaching the pager to a belt or pocket of the user.

In reference to FIG. 5C, pager module 10A of FIGS. 5A and 5B is shown from the opposite perspective. A three position "on-off" switch 74 is provided, which, in addition to turning the pager on, also controls whether the pager operates in a "beeping mode" or a silent mode, i.e., upon receipt of an incoming page, the pager either emits audible beeps or vibrates.

Pager module 10A includes feed-through port 76, which is substantially identical to a PCMCIA device auxiliary port connector. As described hereinabove with respect to auxiliary port connector 68 of FIG. 4, port 76 is provided so that fax/modem module 10B may still be coupled to a telephone network, even when pager module 10A is attached. Signals from fax/modem 10B are simply passed through from 15 pin connector 48 to feed-through port 76. A conventional adaptor cable may then be plugged into feed-through port 76 to couple fax/modem module 10B to a telephone line.

The above description of the present invention is presented in terms of a modular computer peripheral combining the functionality of a pager, a facsimile machine, and a data modem; however, many other devices could be effectively combined into a single peripheral using the principles presented above. As noted above, for example, the fax/modem module may instead, or in addition, include data, voice and cellular capabilities, while the pager module may include any wireless communications capabilities, including two way communications, without departing from the spirit of the present invention.

It will be therefore be understood that the foregoing is merely illustrative of the present invention, and that various modifications can be made by those skilled in the art without departing from the scope and spirit of the invention.

What is claimed is:

1. A data communication device comprising:

a modem module having modem circuitry, first interface circuitry for selectively coupling the modem circuitry to a host computer and second interface circuitry for coupling the modem circuitry to a telephone line;

a pager module having pager circuitry, the pager module removably coupled to the modem module, the pager circuitry operating in a first mode to transmit wireless messages to the host computer via the first interface circuitry, and in a second mode, when uncoupled from the modem module and removably coupled to a battery pack, to receive wireless messages; and switching circuitry disposed in the modem module and having a first operational state wherein the modem circuitry is coupled to the first interface circuitry to enable the host computer to communicate via the telephone line and a second operational state wherein the pager circuitry is coupled to the first interface circuitry to operate in the first mode, the switching circuitry defaulting to the first operational state when the pager module is uncoupled from the modem module.

2. The data communication device as defined in claim 1 wherein the pager module operates, when removably coupled to the modem module, to receive wireless communications.

3. The data communication device as defined in claim 1 wherein the pager module draws power from the host computer when removably coupled to the modem module.

4. The data communication device as defined in claim 1 wherein the first interface circuitry is compatible with PCMCIA expansion slot specifications for a Type II PCMCIA slot.

5. The data communication device as defined in claim 1 wherein the modem module is contained within a card having external dimensions suitable for insertion in a PCMCIA expansion slot that is a Type II PCMCIA slot.

6. The data communication device as defined in claim 1 wherein the modem circuitry includes circuitry to receive and transmit facsimile data via the telephone line.

7. The data communication device as defined in claim 1 wherein the pager circuitry receives alphanumeric e-mail messages.

8. The data communication device as defined in claim 1 wherein the modem module further comprises an auxiliary port having a DATA_FROM_HOST line, a DATA_TO_HOST line, and a CONTROL line;

a data path coupling the first interface circuitry to the DATA_FROM_HOST line, so that data transmitted by the host computer through the first interface circuitry is serially transmitted on the DATA_FROM_HOST line; and wherein the switching circuitry is coupled to the first interface circuitry, to the modem circuitry, and to the DATA_TO_HOST and CONTROL lines, the switching circuitry responsive to a control signal asserted on the CONTROL line, and selectively changeable between a first state wherein the modem circuitry is connected to the first interface circuitry and the DATA_TO_HOST line is disconnected from the first interface circuitry, and a second state wherein the modem circuitry is disconnected from the first interface circuitry and the DATA_TO_HOST line is connected to the first interface circuitry.

9. The data communication device as defined in claim 8 wherein the pager module removably connects to the auxiliary port, and wherein the pager circuitry further comprises control circuitry removably coupled to the DATA_TO_HOST, DATA_FROM_HOST, and CONTROL lines, via the connection to the auxiliary port, so that the control circuitry asserts a control signal on the CONTROL line responsive to a first predetermined data sequence on the DATA_FROM_HOST line, and removes the control signal from the CONTROL line responsive to a second predetermined data sequence on the DATA_FROM_HOST line.

10. The data communication device as defined in claim 8 wherein the data path coupling the first interface circuitry to the DATA_FROM_HOST line further comprises parallel-to-serial data conversion circuitry.

11. The data communication device as defined in claim 9 wherein each of the first and second predetermined data sequences comprises an attention code followed by a command code.

12. A pager module adapted to be removably coupled to a modem module coupled to a host computer, the modem module having modem circuitry and switching circuitry including a DATA_TO_HOST line, a DATA_FROM_HOST line and a CONTROL line, the pager module comprising:

pager circuitry for receiving wireless communications, the pager circuitry including control circuitry coupled to the DATA_TO_HOST, DATA_FROM_HOST and CONTROL lines, the control circuitry asserting a first control signal on the CONTROL line responsive to a first predetermined data sequence received on the DATA_FROM_HOST line, so that the switching circuitry enters a first operational mode wherein the pager circuitry communicates with the host computer via the DATA_TO_HOST line, and asserting a second control signal on the CONTROL line responsive to a second predetermined data sequence received on the DATA_FROM_HOST line, so that the switching circuitry enters a second operational mode wherein the modem circuitry is coupled to the host computer and the pager circuitry is disconnected from the host computer.

13. The pager module as defined in claim 12 wherein the host computer may selectively communicate with the pager module when the pager module is removably coupled to the modem module.

14. The pager module as defined in claim 12 wherein the pager module operates, when removably coupled to the modem module, to receive wireless communications.

15. The pager module as defined in claim 12 wherein the pager modules operates, when uncoupled from the modem module, to receive wireless communications.

16. The pager module as defined in claim 14 wherein the pager module draws power from the host computer when removably coupled to the modem module.

17. The pager module as defined in claim 15 further comprising a battery pack, the pager module removably coupled to the battery pack when the pager module is uncoupled from the modem module.

18. A modem module comprising:

interface circuitry for coupling to a host computer;

modem circuitry;

means for removably coupling a pager module to the modem module; and switching means responsive to a control signal asserted by the pager module responsive to a predetermined data sequence received by the pager module from the host computer, the switching means having a first mode of operation wherein the modem circuitry is coupled to the host computer to communicate via a telephone line, and a second mode of operation wherein the pager module is coupled to the host computer.

19. The modem module as defined in claim 18 wherein the switching circuitry defaults to the first mode of operation when a pager module is not coupled to the modem module.

20. The modem module as defined in claim 18 wherein the modem module supplies power to a pager module via the interface circuitry when the pager module is removable coupled to the modem module.

21. The modem module as defined in claim 18 wherein the interface circuitry, the modem circuitry and the switching circuitry is contained within a card having external dimensions suitable for insertion in a PCMCIA expansion slot that is a Type II PCMCIA slot.

22. The modem module as defined in claim 18 wherein the modem module further comprises:

an auxiliary port having a DATA_FROM_HOST line, a DATA_TO_HOST line, and a CONTROL line;

a data path coupling the interface circuitry to the DATA_FROM_HOST line, so that data transmitted by the host computer through the interface circuitry is serially transmitted on the DATA_FROM_HOST line; and wherein the switching circuitry is coupled to the interface circuitry, to the modem circuitry, and to the DATA_TO_HOST and CONTROL lines, the switching circuitry responsive to a control signal asserted on the CONTROL line, and selectively changeable between the first mode of operation wherein the modem circuitry is connected to the interface circuitry and the DATA_TO_HOST line is disconnected from the interface circuitry, and the second mode of operation wherein the modem circuitry is disconnected from the interface circuitry and the DATA_TO_HOST line is connected to the interface circuitry.

23. A method of enabling a host computer to communicate by a telephone line and wireless messaging using a data communication device comprising a modem module having interface circuitry, modem circuitry and switching circuitry and a pager module for receiving wireless messages, the pager module including pager circuitry and control circuitry, the pager module removably coupled to the modem module, the method comprising steps of:

coupling the data communication device to the host computer;

issuing a first predetermined data sequence by the host computer to the control circuitry of the pager module;

providing a first control signal from the control circuitry to the switching circuitry responsive to the first predetermined data sequence; and responsive to the first control signal, setting the switching circuitry to a first state wherein the modem circuitry is coupled to the interface circuitry to enable the host computer to communicate via the telephone line.

24. The method of claim 23 further comprising the steps of providing a second predetermined data sequence to the control circuitry, providing a second control signal to the switching circuitry, and responsive to the second control signal, setting the switching circuitry to a second state wherein the pager module is coupled to the interface circuitry to enable the host computer to communicate with the pager module.

25. The method of claim 23 further comprising a series of steps of:
  uncoupling the pager module from the modem module;
  generating a default control signal;
  providing the default control signal to the switching circuitry;
  responsive to the default control signal, setting the switching circuitry to the first state; and
  operating the host computer to communicate through the modem circuitry and interface circuitry with the telephone line.

26. The method of claim 23 further comprising a series of steps of:
  uncoupling the pager module from the modem module;
  providing a battery pack;
  removably coupling the battery pack to the pager module; and
  supplying power to the pager module from the battery pack to enable the pager module to receive wireless messages.

27. The method of claim 24 further comprising a step of supplying power from the host computer to the pager module to enable the pager module to receive wireless messages.

* * * * *